United States Patent
Sokol et al.

(10) Patent No.: US 10,915,959 B2
(45) Date of Patent: Feb. 9, 2021

(54) SYSTEM AND METHOD FOR SPEND MANAGEMENT AND INVESTMENT OF FUNDS

(71) Applicant: JPMorgan Chase Bank, N.A., New York, NY (US)

(72) Inventors: Benjamin Sokol, New York, NY (US); Ryan A. Schlosser, New York, NY (US); Duverney Tavares, Cedar Grove, NJ (US)

(73) Assignee: JPMORGAN CHASE BANK, N.A., New York, NY (US)

(*) Notice: Subject to any disclaimer, the term of this patent is extended or adjusted under 35 U.S.C. 154(b) by 623 days.

(21) Appl. No.: 15/296,431

(22) Filed: Oct. 18, 2016

(65) Prior Publication Data
US 2019/0272593 A1 Sep. 5, 2019

(51) Int. Cl.
*G06Q 40/00* (2012.01)
*G06Q 40/06* (2012.01)
*H04L 29/08* (2006.01)
*H04W 4/02* (2018.01)
*G06Q 40/02* (2012.01)

(52) U.S. Cl.
CPC ............ *G06Q 40/06* (2013.01); *G06Q 40/02* (2013.01); *H04L 67/02* (2013.01); *H04L 67/26* (2013.01); *H04L 67/34* (2013.01); *H04W 4/02* (2013.01)

(58) Field of Classification Search
CPC ........ G06Q 40/06; G06Q 40/02; H04L 67/02; H04L 67/26; H04L 67/34; H04W 4/02
See application file for complete search history.

(56) References Cited

U.S. PATENT DOCUMENTS

| 8,170,932 B1* | 5/2012 | Krakowiecki | G06Q 40/12 705/30 |
| 8,676,687 B2* | 3/2014 | McDonough | G06Q 40/06 705/35 |
| 2009/0171776 A1* | 7/2009 | Scipioni | G06Q 30/02 705/14.18 |

(Continued)

FOREIGN PATENT DOCUMENTS

WO WO-02097561 A2 * 12/2002 ....... G06Q 10/06375

OTHER PUBLICATIONS

Nysveen et al: "A review of mobile services research: Research gaps and suggestions for future research on mobile apps", Centre for Applied Research at NHH, Bergen, Norway, ISSN 1503-2140 (Year: 2015).*

*Primary Examiner* — Edward J Baird
(74) *Attorney, Agent, or Firm* — Greenblum & Bernstein, P.L.C.

(57) ABSTRACT

A transaction management method and system are providing for managing disposition of funds for system users based on account activity. The method stores account data for the system users and instructions and at least a downloadable mobile application, The method receives through an interface over a network, an indication of account activity by the system user and determines a type of account activity. The method further identifies identifying a spending category for the account activity and performs an accounting for the spending category to determine if the account activity is indicative of system user underspending. The method further includes investing calculated underspending. An investment card may be utilized.

14 Claims, 10 Drawing Sheets

(56) References Cited

U.S. PATENT DOCUMENTS

| | | | |
|---|---|---|---|
| 2009/0228366 A1* | 9/2009 | Biris | G06Q 30/00 |
| | | | 705/26.1 |
| 2010/0057574 A1* | 3/2010 | Banerjee | G06Q 30/02 |
| | | | 705/14.66 |
| 2010/0268629 A1* | 10/2010 | Ross | G06Q 10/10 |
| | | | 705/35 |
| 2011/0218838 A1* | 9/2011 | Byce | G06Q 30/02 |
| | | | 705/7.31 |
| 2016/0275545 A1* | 9/2016 | Dasdan | G06Q 30/0244 |
| 2017/0195994 A1* | 7/2017 | Cole | H04W 76/10 |
| 2017/0200126 A1* | 7/2017 | Roy | G06Q 10/1057 |

* cited by examiner

SYSTEM AND METHOD FOR SPEND MANAGEMENT AND INVESTMENT OF FUNDS

FIELD OF THE INVENTION

Embodiments of the present invention are generally related to systems and methods for spend management and investment of funds and in particular to tracking and analyzing data and managing, re-directing, and investing funds based on the characteristics of transactions.

BACKGROUND OF THE INVENTION

Fluctuating and difficult economic times have complicated the processes of budgeting, saving, and investing. Individuals tend to lack understanding of how small changes in their spending habits can impact their savings over time. Furthermore, individuals having little disposable income often believe that the little they are able save would be insignificant and not ultimately worthwhile. Furthermore, with interest rates hovering at historically low levels, savings accounts are not producing positive results.

Low and middle income individuals are often unable to invest using the tools available to wealthier individuals. Lower and middle income individuals are often excluded from employee retirement plans and from utilizing financial institutions with elaborate application processes. They typically are unable to afford minimum amounts that are required by brokers for investment. Lower and middle income individuals need access to investments that allow them to invest smaller amounts. Smaller and frequent contributions are much easier for the majority of the population to afford.

Despite the obstacles to budgeting, saving, and investing, various tools have become available to enable efficient tracking of expenditures. Credit card issuers offer statements categorizing purchases so that card users can view the distribution of their expenditures. This categorization can be performed based on receipt data provided by merchant systems.

With the popularization of smartphones, tablets and other mobile devices, mobile applications, or "apps," have become household terms. Apps are computer applications that execute on mobile devices. Like applications that execute on traditional computing devices, apps allow users to perform a wide range of actions, from simple (e.g., access the Internet, take a photo) to specialized (e.g., file tax forms, play a board game). For instance, many banking institutions provide customers with apps to access to bank accounts to review balance information, transfer money, pay bills, and perform other related actions. Similarly, many financial institutions also provide customers with apps that review the performance of the stock markets, complete trades, configure automated trades using user-defined limits and stops, and perform other intricate trading operations. Various vendors provide mobile apps for use by their customers for making purchases, obtaining loyalty points and rewards, receiving information about promotions, etc.

Accordingly, a solution is needed that will leverage evolving technologies to record information pertaining to each user transaction in order to enhance user control over the financial landscape of the user. Further, the system should allow mobile purchasers to pre-set parameters via a mobile application and allow others to set parameters over the Internet via a website. Additionally, the system should be capable of promoting both budgeting and investing to enhance the overall financial health of the user. A solution is needed that is flexible, convenient, and user friendly for the majority of the population. Furthermore, a solution is needed that does not require individuals to have knowledge of how financial investing works.

SUMMARY OF THE INVENTION

Embodiments of the invention are directed to systems and methods for spend management and investment of funds and in particular to managing transactions in order to enhance budgeting and investing utilizing electronic investment and budgeting tools.

In one aspect of the invention, a transaction management system is provided for managing disposition of funds for system users based on account activity. A computer memory stores account data for the system users, instructions, and at least a downloadable mobile application, wherein the mobile application is downloadable over the Internet for installation on a system user mobile device. The system additionally includes an interface for receiving parameters entered by the system users through the mobile application on the system user mobile device or through a website for storage in the computer memory. The system additionally includes a computer processor accessing the computer memory and executing the instructions to perform multiple steps. The steps include receiving, through the interface over a network, an indication of account activity by the system user, determining a type of account activity, and identifying a spending category for the account activity. The steps additionally include performing an accounting for the spending category to determine if the account activity is indicative of system user underspending and generating a push notification to the system user mobile device when the account activity is indicative of underspending to offer an investment option to the system user. When the account activity is not indicative of underspending, the system generates a push notification to the system user mobile device to provide the system user with an accounting update.

A transaction management method is provided for managing disposition of funds for system users based on account activity. The method includes storing account data for the system users and instructions and at least a downloadable mobile application, wherein the mobile application is downloadable over the Internet for installation on a system user mobile device. The method further includes accessing the computer memory and executing the instructions using a computer processor to perform steps including; receiving, through an interface over a network, an indication of account activity by the system user, determining a type of account activity, and identifying a spending category for the account activity. The method further includes performing an accounting for the spending category to determine if the account activity is indicative of system user underspending. If the system user is underspending, the method includes generating a push notification to the system user mobile device to offer an investment option to the system user. If the user is not underspending, the method includes generating a push notification to provide the system user with an accounting update.

In embodiments of the invention, push notifications can include selectable investment options. The investment options may include, for example, savings accounts, money market accounts, ETFs, stocks, mutual funds, or index funds. System user funds may be pooled to maximize return.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION OF THE INVENTION

Embodiments of the presently disclosed invention provide a method and system for spend management and investment of funds that operate by monitoring transactions and analyzing transaction data in order to facilitate budgeting and investing. In particular, embodiments of the invention provide for the investment of excess funds when budgeting goals have been met and facilitate intelligent investing on behalf of system participants.

In embodiments of the invention, individuals are able to invest in the stock market and other investment instruments resultant to making a purchase or by utilizing an investment card account at a merchant establishment. The system may utilize an investment card similar to a debit card and an input device similar to a payment terminal to activate and purchase investments. An objective is to provide access to the stock market and other valuable investing resources to less privileged giving the individuals the opportunity to invest amounts that they can afford (i.e. 5, $10 . . . ). Thus individuals are able to invest smaller amounts on a frequent basis. The investments may be placed into an investment pool that can be managed by investment software within the transaction management system created by professional investors.

Figure 1:
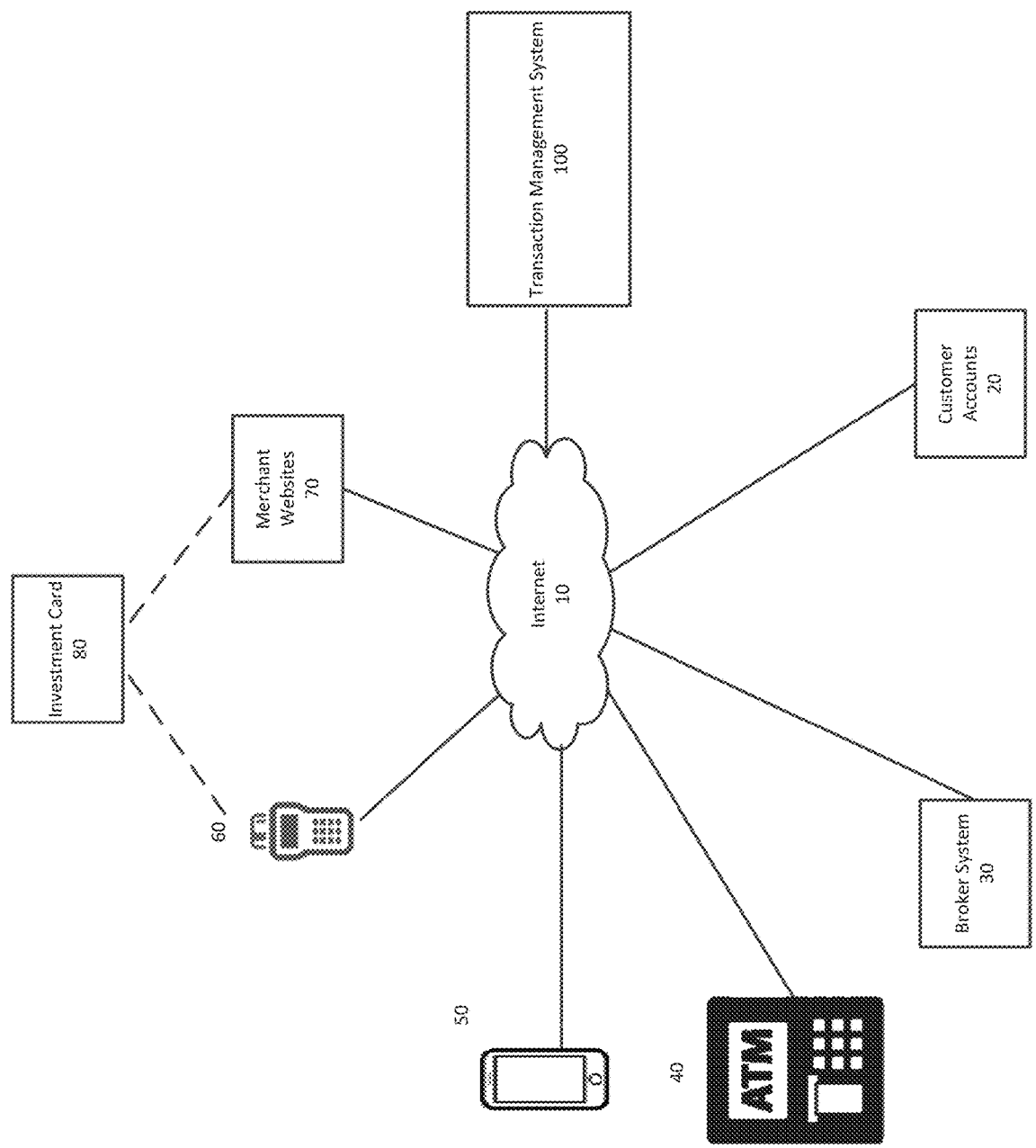
FIG. 1 is a block diagram illustrating an operating environment for a transaction management system in accordance with an embodiment of the invention.

FIG. 1 is a block diagram illustrating an operating environment for a transaction management system 100 in accordance with an embodiment of the invention. The transaction management system 100 may be connected over a network 10 with multiple cooperating systems, such as customer accounts server 20, broker system 30, ATMs 40, system user devices 50, POS devices 60, and merchant websites 70. In embodiments of the invention, an investment card 80 may be utilized at merchant websites 70, POS 60, and ATM 40. Additional systems or devices may be included in the operating environment.

The transaction management system 100 may operate through a host server that administers multiple computing systems and applications for internal and external users. The host server can host web sites, files, images, games and similar content. The host server can be shared among many clients. The transaction management system 100 interacts with the interconnected systems to manage accounting, re-direction, and investment of funds resulting from a transaction involving a purchase, withdrawal of funds, or deposit of funds by system users.

The network 10 is preferably the Internet, but may be or include other types of networks. Furthermore, even though only one network is shown, multiple networks may be used. For example, the POS device 60 may communicate over a different network with the transaction management system 100 than the user computing systems 50. The network 10 may include a wired or wireless local area network (LAN) and a wide area network (WAN), wireless personal area network (PAN) and other types of networks. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

The customer accounts server 20 may be or include a computing system that provides access to user financial accounts. The customer accounts server 20 may be hosted by, for example, a financial institution and may access checking accounts, savings accounts, bank card accounts, investment accounts, and other types of accounts. The customer accounts server 20 may include investment accounts managed by investment software operating within or in conjunction with the transaction management system 100.

The broker system 30 may also be hosted by a host server within a financial institution or other entity. The broker system 30 may include investment software for engaging in investment of funds from customer accounts. In embodiments of the invention, the system users may authorize their funds to be pooled with those of other system users for investment purposes by the broker system 30. The broker system 30 may optionally be included within the transaction management system 100.

The automated teller machines (ATMs) 40 may be operable to dispense cash, accept deposits, and perform various other functions in response to system user requests. In embodiments of the invention, the investment card 80 may be cooperatively operated with the ATMs 40. For example, system users may cause the investment card to be read by the ATM 40 and either deposit cash or transfer funds from another account to an investment account utilizing investment software and pooling the system user funds with those of other system users to maximize returns.

The user mobile devices 50 may include handheld devices including mobile smartphones, such as Android® phones and iPhones®, tablets, or hand-held wireless devices such as PDAs, multiprocessor systems, microprocessor-based or programmable consumer electronics, minicomputers, other handheld devices that may now be available or may in the future become available. These mobile devices 50 may utilize a downloadable app supplied by the transaction management system 100 for use in conjunction with the transaction management system 100. The mobile device 50 includes a processor and memory and may store, for example, applications including a browser, and the transaction management mobile application. The processor may also be connected to additional components, either stored in a memory or installed as separate hardware components, such as for example battery or power source, clock, camera, input interface, network interface, output devices, geo-locator, and an operating system. The transaction management mobile application may operate in conjunction with a geo-location apparatus in order to determine a current system user location.

While the mobile device 50 is described herein as interacting over the Internet with the transaction management system 100 through the use of the transaction management mobile application, the mobile device 50 may additionally or alternatively interact with the transaction management system 100 using a browser to access the transaction management system 100 website as will be further described below. In embodiments of the invention, the transaction management mobile application causes the system user mobile device to access one or more URLs from the transaction management system website.

The POS devices 60 may allow a merchant to insert, swipe, or manually enter the required investment card information, to transmit this data to the merchant service provider for authorization and finally, to transfer funds to the merchant. POS devices may transmit data over a standard telephone line or a wired or wireless Internet connection. Some also have the ability to cache transactional data to be transmitted to the gateway processor when a connection becomes available. Remote wireless terminals can transmit card data using either cellular or satellite networks. In the instant case, the POS device 60 may be programmed by way of proprietary software installed on the device for handling investment card transactions. The POS device 60 may directly communicate with the transaction management system 100 utilizing Secure Hypertext Transfer Protocol (HTTPS) over the Internet. The system may be designed using Service Oriented Architecture (SOA) to integrate the POS device 60 with transaction management system 100 via web services. Existing POS devices 60 can be updated with a software upgrade to integrate with the transaction management system 100.

In embodiments of the invention, merchants register with the transaction management system. Registered merchants would be assigned a merchant account number that uniquely identifies the merchant. Merchants may stock investment cards and make them available to the public for purchase. In embodiments of the invention the transaction management system 100 may track merchant sales in order to compensate merchants. For example, merchants may collect a fee equivalent to 50% of the price of the investment card. For instance, if the investment card is priced at $2.00, the merchant may keep $1.00 for the sale. The other 50% would be used to offset manufacturing costs of the cards.

The merchant websites 70 may be hosted by a merchant server including at least one processor and multiple applications executed by the processor capable of performing desired functions to interact with the transaction management system 100. The merchant websites 70 may allow system users access through a URL when the system users are operating a browser on the mobile device 50 or other computing system.

The investment card 80 may optionally be provided for interaction with the transaction management system 100. The investment card 80 may take the form of a typical credit or debit card and have all of the associated functionality. As set forth above, the investment card may be available as an over the counter product. The investment card 80 leverages existing payment terminal infrastructure typically used to process credit card transactions. The investment card 80 may be in a blank state until activated at the request of a system user. Once activated, the investment card 80 can be used for purchases, withdrawals, and to make contributions to an investment account or savings account. In embodiments of the invention, system users may be provided with account selection options when utilizing the investment card 80 so that system users may select a savings account, investment account, or other type of account.

Figure 2:
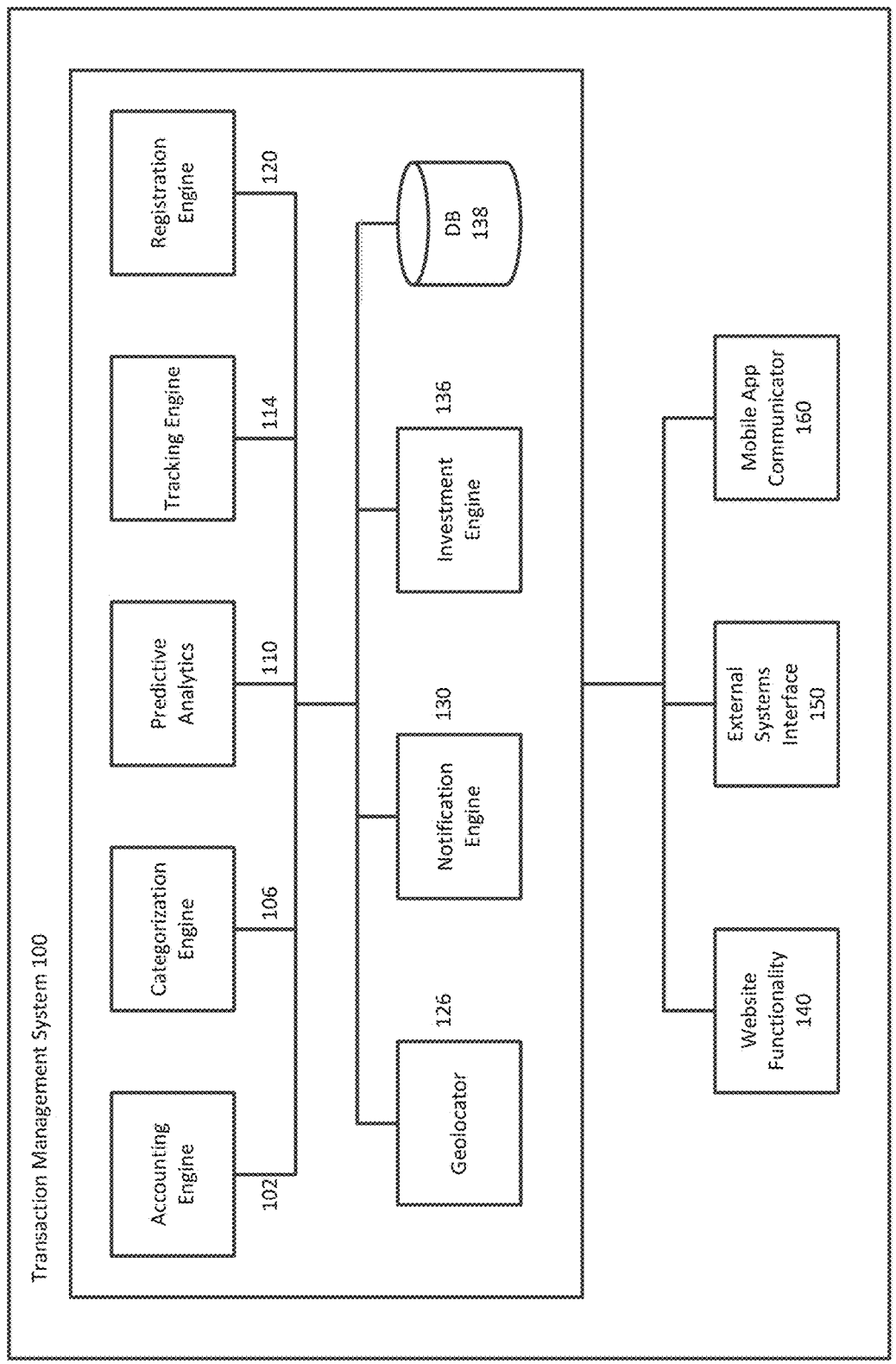
FIG. 2 is a block diagram illustrating a transaction management system in accordance with an embodiment of the invention.

FIG. 2 is a block diagram illustrating a transaction management system 100 in accordance with an embodiment of the invention. The transaction management system 100 may include one or more computers having processors and memories and running algorithms to perform specific functions. In addition to the features shown, various other hardware and software components may be included within the system and are within the scope of the invention. The transaction management system 100 may include a backend system having an accounting engine 102, categorization engine 106, predictive analytics 110, a tracking engine 114, and a registration engine 120. The back end system may also include a geo-locator 126, a notification engine 130, an investment engine 136 and a database 138. These components may operate in conjunction with front end components such as website functionality 140, an external systems interface 150, a mobile app communicator 160, and optionally additional components.

Accounting engine 102 is provided in order to assess system user spending patterns. For example, the accounting engine 102 will determine how much a user spends on certain types of purchases in a predetermined time period. The accounting engine interacts with the tracking and categorization functionality to keep an updated accounting of spending per category for each system user. The accounting engine 102 may interact with the predictive analytics in order to calculate underspend per category and total overall underspending.

Categorization engine 106 is provided in order to categorize user purchases. The categorization engine 106 may operate in conjunction with other components of the transaction management system 100 to generate push notification to the user to request categorization when a category for a purchased item is unknown. In other instances, the categorization engine 106 may determine, based on merchant data or voluntarily input purchaser data, a most appropriate category for a transaction.

Predictive analytics 110 may operate in conjunction with the other engines of the transaction management system to predict future system user spending based on tracking, categorization, and existing accounting. The predictive analytics 110 may operate in conjunction with the geo-locator 126 in order to predict a system user purchase based on the system user location.

The tracking engine 114 may serve to track transactions using the investment card 80 as well as transactions using other cards or transactions completed through payment of cash or check. The tracking engine 114 may further operate in conjunction with the geo-location functionality in order to track potential transactions based on user location.

Registration engine 120 may operate to register system users for the system. Registration may occur, for example, by entering online credentials. Registration entitles system users to the budgeting and investing functionality offered by the transaction management system. In embodiments of the invention, the registration engine 120 also registers merchants. As set forth above, merchants may, in embodiments of the invention, register in order to sell the investment card. The registration engine 120 may optionally allow system users to enter target budget parameters per category upon initial registration. Alternatively, these parameters may be entered at another time through the website or mobile application.

Geo-locator 126 may operate in conjunction with the geolocation tools of the mobile phone 50 in order to locate registered system users and utilize predictive analytics 110 to predict a system user purchase based on the system user location. For example, the tracking engine 114 may have tracked ten identical purchases by the user at a particular location, such as the Silver Diner on Elm Street. For example, the tracking engine has tracked a purchase of a food item costing $12.50 repeatedly. When the geo-locator 126 determines that the system user is at the Silver Diner on Elm St., the predictive analytics suggest that the user will purchase a food item costing $12.50. The notification engine 130 may operate in response to this prediction.

Notification engine 130 may operate to generate notifications, such as push notifications to the system users. For example, push notifications may be sent to users regarding the impact of their purchases on their budgetary goals. The notification engine 130 may also generate push notifications to ask users to categorize purchases or to send confirmation of a purchase in a particular category. The push notifications may provide the user with access to additional data. For example, the push notifications may include a URL, that when activated, takes the user to a budgeting interface having historical data. Alternatively, the push notification may inform the system user that she has underspent her budget during a particular statement period and offer an investment choice. The push notification may include an accept button and a decline button so that the investment of the underspent amount may be executed with minimal effort on the part of the system user. Other push notification options may be utilized so that the user is able to direct an investment with one click and without logging into an account or system.

Investment engine 136 may direct the funds upon acceptance of an investment recommendation by the user. The investment engine 136 may invest available balances from a plurality of accounts and invests in stocks, or other investment instruments. The transaction management system 100 will have or have access to a portfolio of investment instruments designed to maximize gains and lower risks by diversifying across several investing options. For example, when a user finds that she has $100 underspend in the food category, she can respond to the push notification by accepting a recommended investment of the $100. The investment engine 136 will cause the $100 to be invested. In alternative embodiments, the system user may utilize the investment card 80 at an ATM and deposit $50 cash for investment. In response, the investment engine 136 relegates the $50 to appropriate investment vehicles. In embodiments of the invention, the investment engine may provide the system user with the flexibility to make a payment to a designated fund for each time an item is purchased (e.g., a user buys a cup of coffee for $3.55; a matching investment of $3.55 is transferred from the user's account of choice to the investment or savings account. The investment engine 136 may provide system users with extra incentives for staying within their overall budget (for one budget cycle or multiple budget cycles) by being awarded offerings such as 1.5× points for "smart spending" or staying within budget for any given category.

The investment engine 136 may interact with the notification engine to provide investment selections by generating a unique URL containing the selections on the transaction management website, by sending an alert to the subscriber mobile device including the URL, wherein selection of the URL will open the subscriber mobile app on the mobile device and allow the subscriber to view available selections on the transaction management web site. These alerts can be received by the subscriber mobile device when the subscriber is offline and bring the subscriber online through selection of the uniquely generated URL.

Database 138 may store user data and downloadable applications, and stored parameters may be housed in data storage areas that include a computer memory structure capable of storing data and may include one or more databases. The data storage areas may store data gathered from the various sources described above with respect to FIG. 1. The database 138 may communicate with the tracking engine 136 to receive and store tracking parameters. This data may be structured, semi-structured, or unstructured. The data storage areas may include file systems and databases for storing large amounts of data. For example, the data storage areas may include HP 3PAR StoreServ® Storage systems. Those of ordinary skill in the art will appreciate that other computer storage systems for storing large amounts of data may be implemented. Data stored in the data storage areas may be managed and communicated with an Object-Relational Database Management System, such as Postgre® or other Object-Relational Database Management Systems that are known in the art. Multiple data storage areas may have different structures and store different types of data. For example, unstructured data may be stored separately from cleansed and structured data.

The downloadable applications preferably include a downloadable mobile app for use by the system users. The mobile app is downloadable over the Internet via a network interface to the system user mobile devices as described above. In embodiments of the invention, the system user visits the transaction management website using a browser application to download the mobile application. Once downloaded, the downloadable mobile application may operate on the user mobile devices to interact with the transaction management website.

The stored parameters include subscriber entered parameters received through the mobile application and/or the transaction management website. The parameters may include account information of system users entered through the mobile app and thus, system user account information and address information may also be stored as parameters. The parameters may, for example, include spending goals per category.

Additional components are provided to allow for interaction between system users and the transaction management system 100 and further allow for interaction between the transaction management system 100 and other external systems, such as the broker systems and merchant systems.

Web site functionality 140 allows system users to enter parameters and further conveys information to visiting system users. In embodiments of the invention, the web site functionality 140 may provide each system user with a personalized web experience. When investors access the website to check on their account status, distributions, and performance, a personalized experience may be provided. Advertisers may utilize external systems to provide advertising campaigns for display to the system users. The advertisements may include an interactive link that will cause the user to be re-directed to an advertiser site. In embodiments of the invention, advertisers are charged for each re-direction. Accordingly, the transaction management system can share received funds for advertising with system users and direct these funds to the investment engine 136.

An external systems interface 150 allows communication with other external systems, such as POS systems or broker systems. A mobile app communicator 160 accepts input from system user mobile apps and updates the mobile app when required. All of these components may receive commands from the notification engine 130 in order to send notifications to the system users or other system participants. The above-described components deposit information in the database 138 when appropriate.

Figure 3:
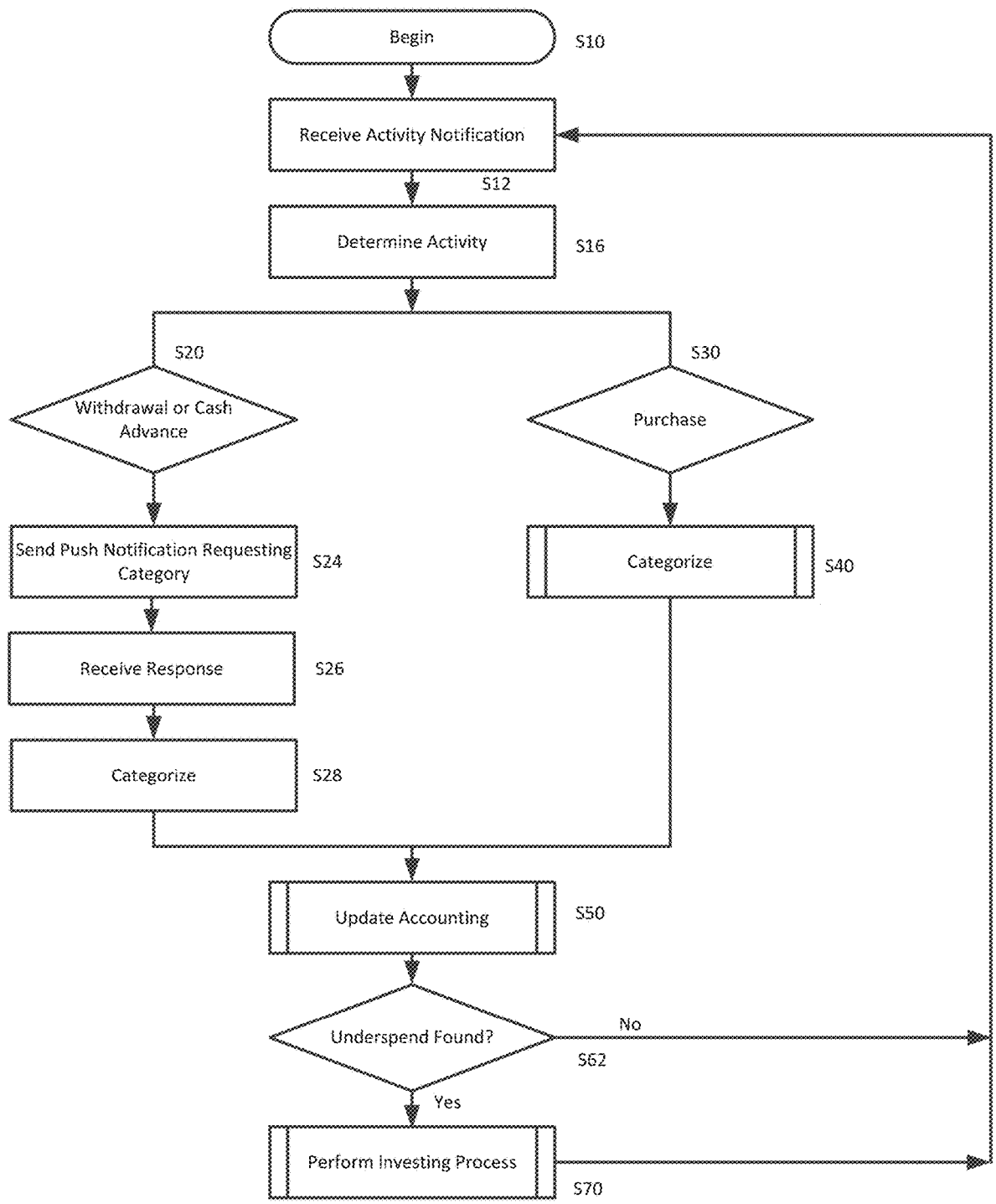
FIG. 3 is a flow chart illustrating steps for investing utilizing the transaction management system in accordance with an embodiment of the present invention.

FIG. 3 is a flow chart illustrating steps for utilizing the transaction management system 100 in accordance with an embodiment of the present invention. The process begins in S10 and the system receives activity notification in S12. The activity may, for example, be a purchase at a point of sale terminal or through a merchant website. Alternatively, the purchase may be an ATM or teller withdrawal or a cash advance. In S16, the system determines which type of activity has been detected.

If a withdrawal or a cash advance has been detected in S20, the system sends a push notification to a system user device requesting a category for the withdrawal. For example, a system user may withdraw cash to go out to dinner with friends or to pay for goods or services in a location where credit cards are not accepted or incur extra charges. Thus, in S26, the system receives a response from the system user indicating the category of expenditure. The category may for example, be "dining", "home repair", or "travel". In S28, the system categorizes the transaction in accordance with the system user response.

If, as a result of the determination in S16, the system determines that the activity is a purchase in S30, the system categorizes the purchase. Categorizing the purchase can also be accomplished by sending a push notification and waiting for a response. However, in many instances, the merchant processing provides sufficient information for the transaction management system to categorize the purchase. Further options for categorization include voluntary categorization by the system user. The system user may utilize a camera feature of the mobile device to capture a receipt so that the categorization components can accurately categorize the purchase without sending a push notification.

Upon categorization of the purchase in S28 or S40, the system utilizes the accounting engine to update internal accounting records in the database. An exemplary process of updating accounting is shown and further described below with respect to FIG. 4. After updating accounting, the system determines if an underspending status is present in S62. Underspending can occur per category or based on total expenditures in a predetermined time period. If no underspending status is found in S62, the system returns to monitoring account activity in S12. However, if underspending status is found in S62, the system performs an investing process in S70. Details of an exemplary investing process are further described below with respect to FIG. 5. Upon performing the investing process, the system returns to monitoring for activity in S16.

Figure 4:
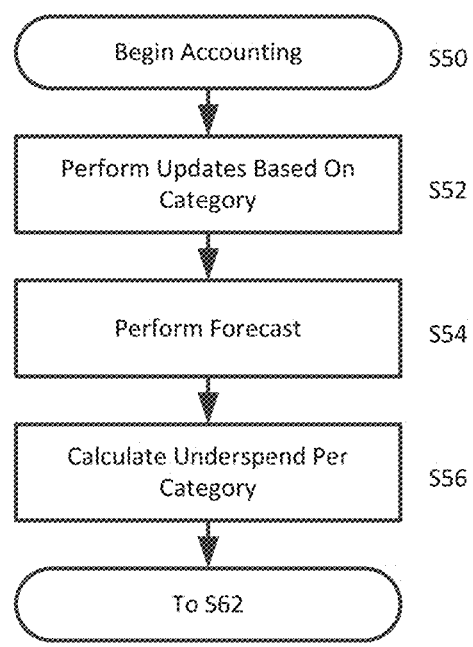
FIG. 4 is a flow chart illustrating steps for accounting and budgeting in accordance with an embodiment of the invention.

FIG. 4 is a flow chart illustrating steps for accounting and budgeting in accordance with an embodiment of the invention. The process begins the accounting in S50 and performs updates by category in S52. The process may also update a total in addition to updating a single category or every category. In S54, the system performs a forecast based on historical information in the database and the current activity ascertained through the update. In S56, the system calculates underspending based on a pre-determined budget and the forecast. For example, the received activity may have been a food purchase. The system, in S52 updates the food category to include the additional spending activity. The system may perform a forecast for a current statement period, current month, or other predesignated time period. For example, the system user may store a budget of $600 for food during a statement period. Halfway into the statement period, the system determines that the user has only spent $200 and thus forecasts that the system user, based on previous behaviors, will only spend $500 on food rather than $600. In this instance, the system may predict an underspend in the food category of $100. However, the system may perform a more sophisticated accounting to ensure that a total underspend forecast is accurate for all combined categories. For example, the system may determine that the system user has overspent on entertainment, thus reducing the overall projected savings to $25. Upon reaching an accurate underspend number, the system returns to S62 and proceeds to the investment process. In alternative embodiments, the system may only proceed to the investment process at the end of the predesignated period and instead, send the system user a push notification with a spending update after each accounting update occurs. In this embodiment, only actual underspending amounts, rather than projected underspending amounts may be offered to the system users for investment.

Figure 5:
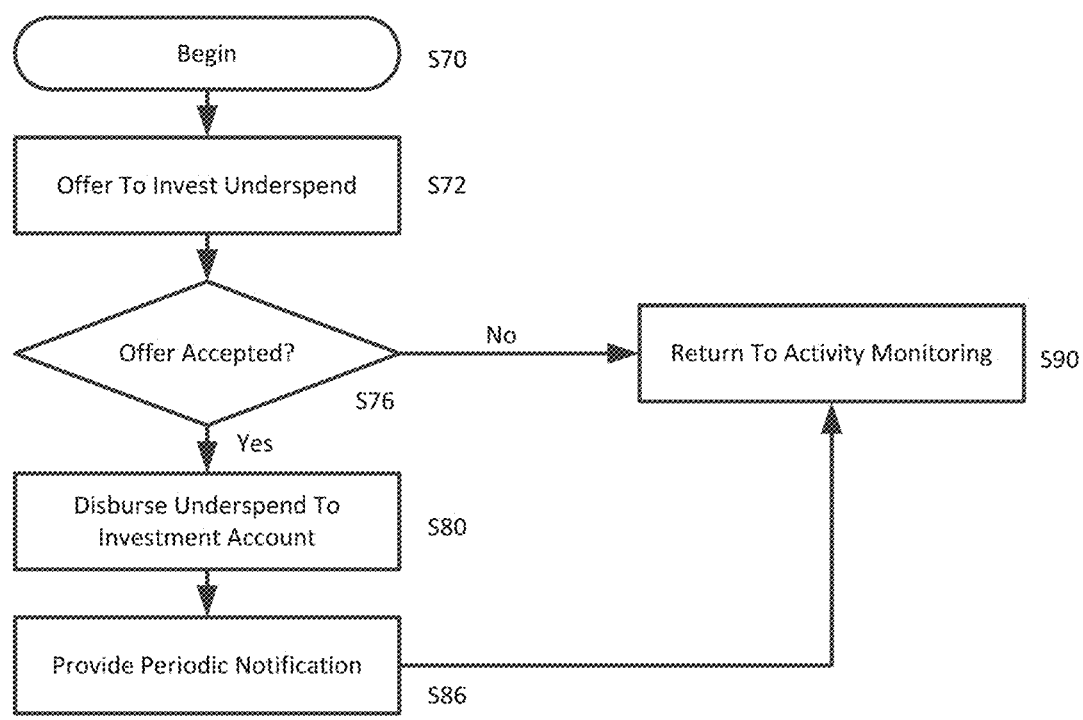
FIG. 5 is a flow chart illustrating an investment method in accordance with an embodiment of the present invention.

FIG. 5 is a flow chart illustrating an investment method in accordance with an embodiment of the present invention. The process begins in S70 and the system sends an offer to the user to invest the calculated underspend amount in S72. The offer may be made, for example, by push notification. In S76, the system determines whether the offer has been accepted. In embodiments of the invention, the offer may be accepted by utilizing a URL in the push notification to activate the transaction management mobile application. Upon reaching the mobile application, the system user may elect to invest all or a portion of the underspend. Alternatively, the push notification may include selections options such as "Accept" or "Reject", so that the system user may invest with a single click.

If the system user does not accept the investment offer, the system returns to activity monitoring in S90. However, if the system user does accept the investment offer, the system disburses the underspend amount to the investment account in S80 and provides periodic investment updates in S86. The system returns to activity monitoring in S90.

While the flowcharts above illustrate a basic process of budgeting and investing, the invention is not so limited. For example, push notifications may be provided based on multiple types of calculations. As set forth above, push notifications may be provided for marking the category of purchase in real-time during the transaction or immediately after payment. The transaction management system may then provide budget data as follow up notification. The provided data may include total spend, remaining budget, historical spend for past budget cycles, or even 'average consumer spend' for the budget category (which may include data from consumers in similar geographic locations and salary-ranges). While that data is described as being conveyed by a push notification, it may be available on POS system screens as well as on the mobile device. As set forth above, cash advances and withdrawals may provide a prompt to categorize the reason for withdrawal and provide budget/spend data (e.g., $80 withdrawn; $50 for food and $30 for movie tickets).

As mentioned above, predictive analytics may be used to forecast total-spend in certain categories. For example, the system user may visit Starbucks between 2-3 times daily on weekdays, and 1 time daily on weekends. By mid-month when the total is $100, the system could push a notice to the consumer over mobile or browser (or any other network connected device) that the expected monthly spend at that vendor or on the "coffee" category is expected to be $200 for the month. Push notifications may be utilized to let system users know as the budget reaches 50%, 75%, etc.

Additional functionality is contemplated that would allow the system to track pricing at different locations. Push notifications may be provided indicating that the item purchased was available for a lower price at a different vendor, with additional data attributes about that merchant such as distance from current location, and whether the item is on temporary sale or priced at a standard rate.

Further, if a system user is in a physical location, such as a store (logged through GPS, NFC, location beacons, or other means), the system may determine the likelihood of a user purchasing a good with cash in the store (e.g., 5 minutes spent waiting in line by register, but no registered card was used). In that case, a push notification may be sent to inquire about the possible transaction.

Figure 6:
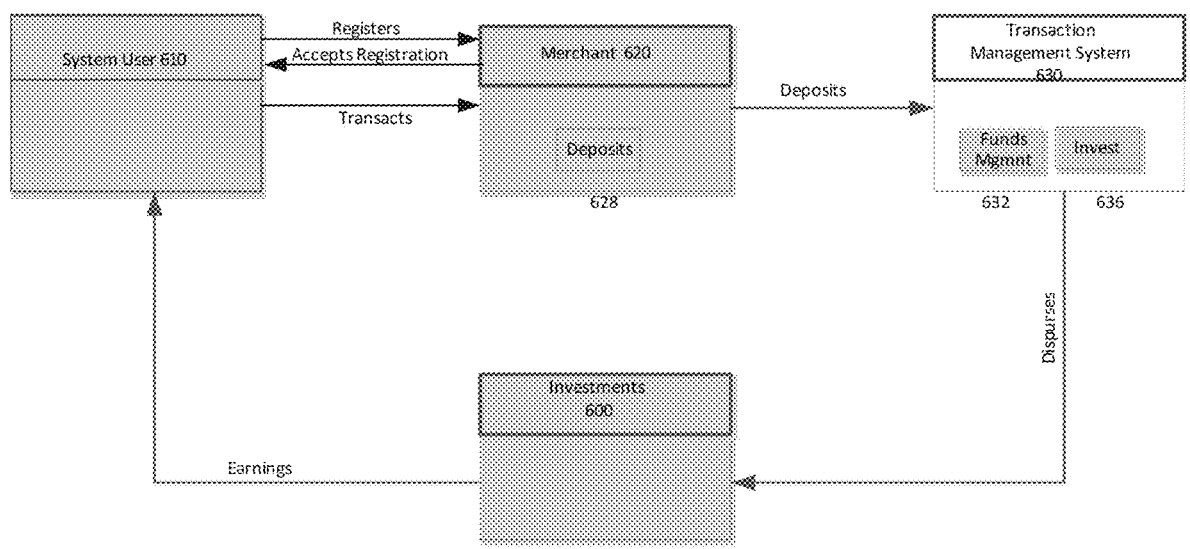
FIG. 6 is a flow diagram illustrating flow between system participants in accordance with an embodiment of the present invention.

FIG. 6 is a flow diagram illustrating flow between system participants in accordance with an embodiment of the present invention in which a system user makes a purchase using the investment card. The system user 610 registers the investment card through a merchant 620 and performs a transaction. The merchant 620 makes a deposit 628 of a requested amount of money with transaction management system 630. The transaction management system 630 performs investment 636 and funds management 632 in order to create and maintain investments 600. Earnings from the investments then become available to the system users.

Figure 7:
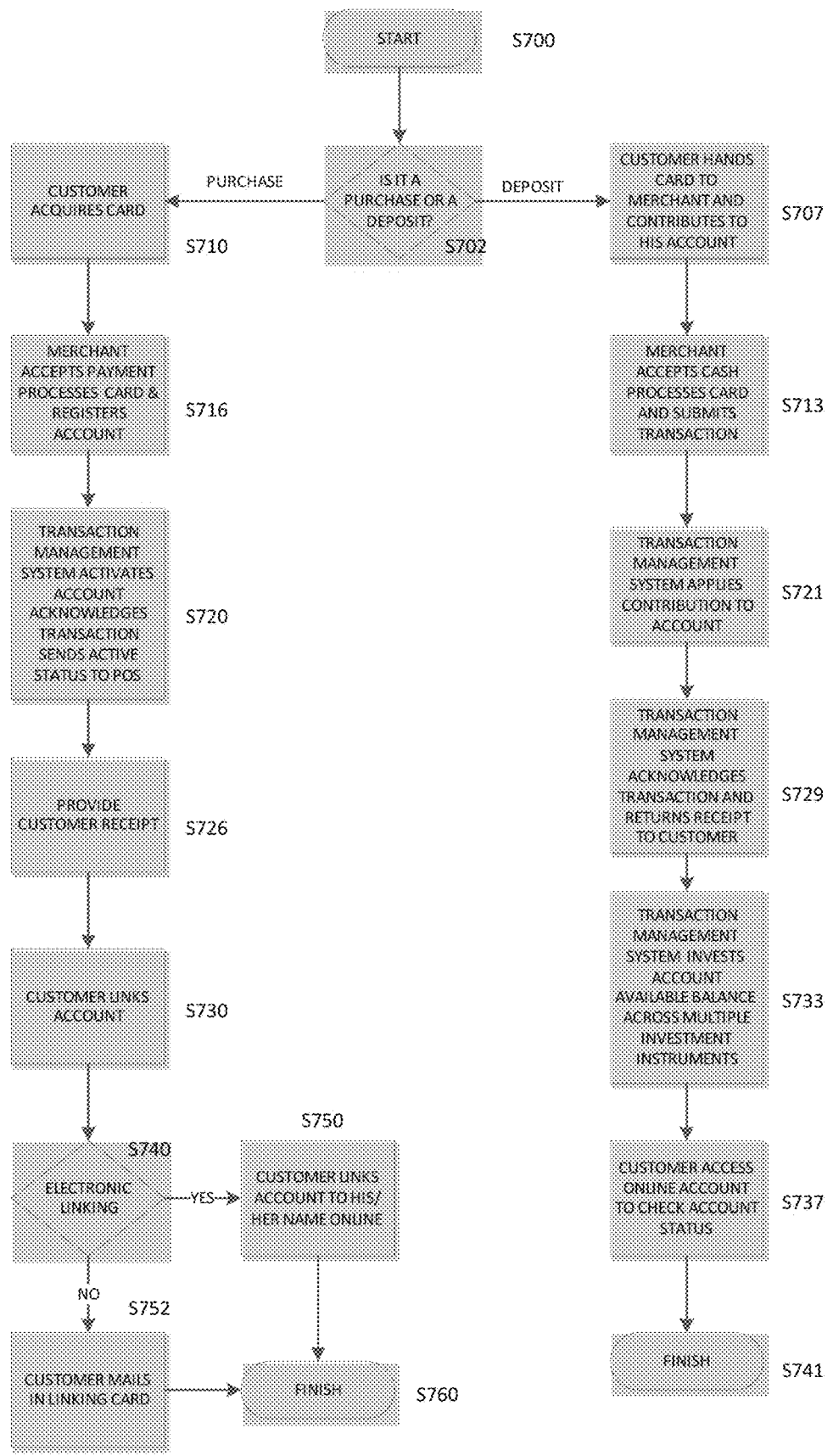
FIG. 7 is a flow chart illustrating a method for making an investment in accordance with another embodiment of the invention.

FIG. 7 is a flow chart illustrating a method for utilizing an investment card in accordance with another embodiment of the invention. The process starts in S700 and the system determines if the transaction is a deposit or a card purchase in S702. If the transaction is a card purchase in S702, then the system user acquires a card in S710 and the merchant registers the account in S716. The registration may occur by scanning or swiping the card. In S720, the transaction management system activates the account and sends the active status to the merchants POS. In S726, the system provides a customer receipt enabling the customer to link to the account. The receipt may, for example, be an electronic receipt enabling the customer to execute linking online in S740. If the system user elects to utilize online linking in S740, the system user proceeds to the appropriate web location in S750 from the electronic receipt in S750 and the process is complete in S760. If the system user opts out of electronic linking in S752, the system user may mail a linking card provided by the merchant in S752 and the process is complete in S760.

If in S702, it is determined that the transaction is a deposit, the customer provides the card to the merchant in S707. The merchant accepts the card, which may in embodiments of the invention, be provided to the merchant with a cash deposit in S713. In other embodiments of the invention, the system user simply supplies the card and the transaction management system performs the accounting process described above to calculate underspend and determines the amount of underspend to apply as an investment contribution. The amount is applied in S721. In S729, the transaction management system acknowledges the transaction and transmits a receipt, which may be push notification, to the customer. In S733, the transaction management system invests the available balance, preferably across multiple investment instruments and the process ends in S741.

Figure 8:
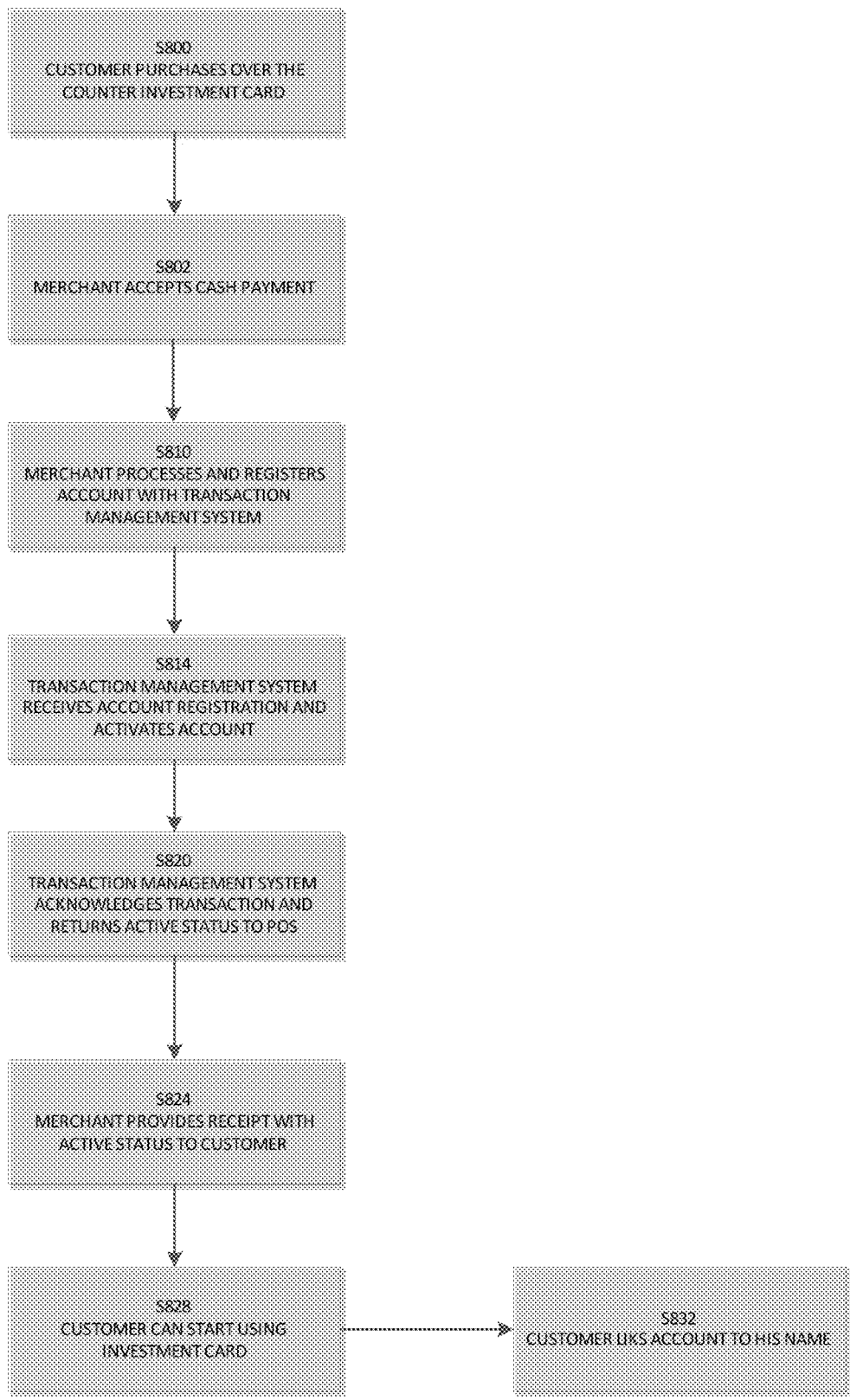
FIG. 8 is a flow chart illustrating a method for making an investment in accordance with an alternative embodiment of the present invention.

FIG. 8 is a flow chart illustrating a method for registering and an investment card in accordance with an alternative embodiment of the present invention. In S800, the system user purchases the investment card from a merchant. In S802, the merchant accepts cash payment for the card. In S810, the merchant swipes or otherwise reads the card and registers the account with the transaction management system. In S814, the transaction management system receives the account registration and activates the account. In S820, the transaction management system acknowledges the purchase of the card and returns active status to the point of sale. In S824, the merchant transmits a paper or electronic receipt to the customer. In S828, the system user can begins using the investment card and in S832, the system user links the account to his name.

Figure 9:
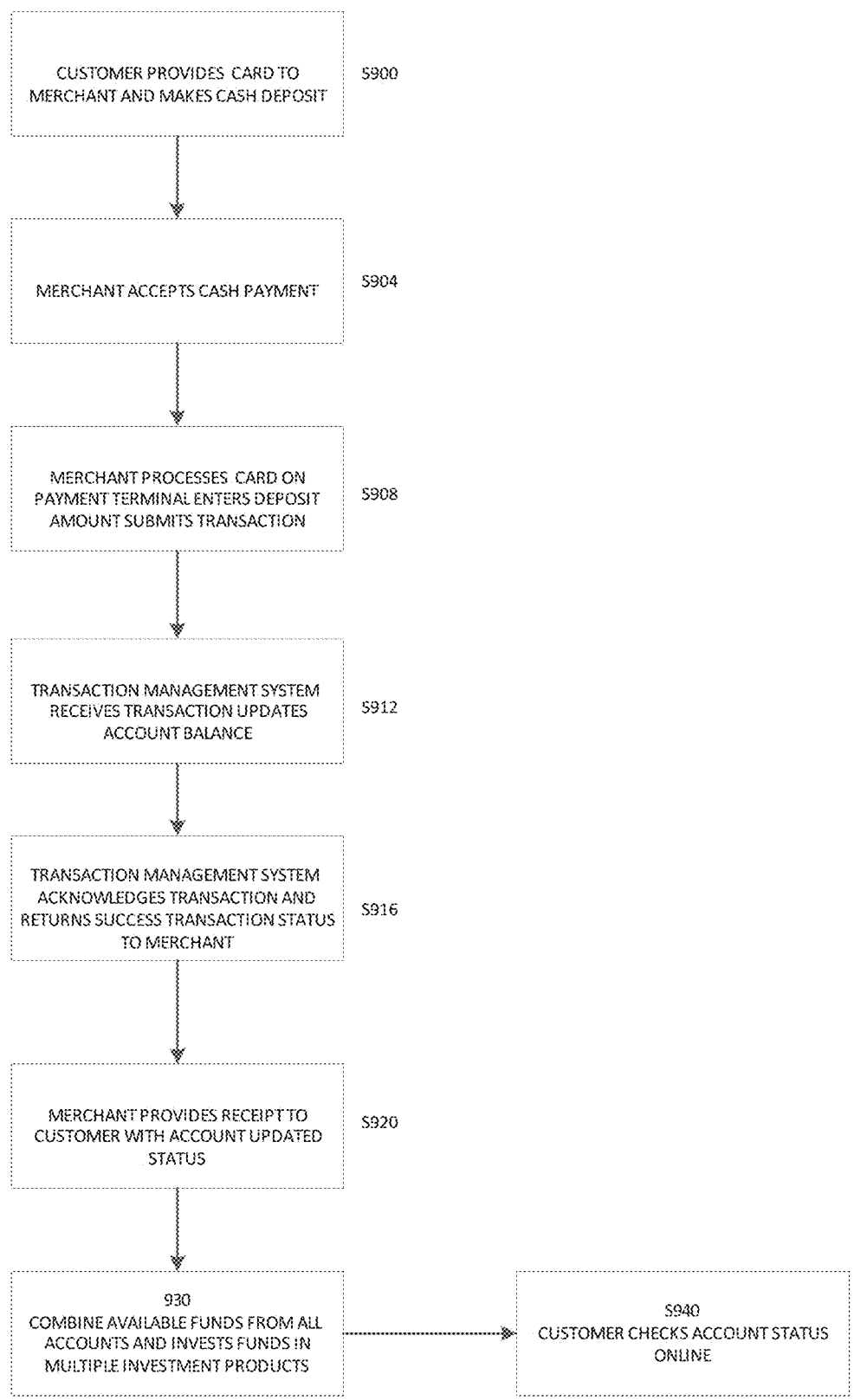
FIG. 9 is a flow chart illustrating a method of investing in accordance with another embodiment of the invention.

FIG. 9 is a flow chart illustrating a method of investing in accordance with another embodiment of the invention. In S900, the system user provides the card at the POS to the merchant in order to make a deposit. In some instances, the deposit may be a cash deposit and in other instances, the card may be linked to an account and the deposit amount may be withdrawn from the account. In S904, the merchant accepts the card and cash if provided. In S908 the card is swiped or scanned at the POS and the transaction is submitted. In S912, the transaction management system receives the transaction notification and updates the account balance in the investment account. In S916, the transaction management system acknowledges the transaction and returns successful transaction status to the merchant. In S920, the merchant provides the receipt to the customer with an updated account status. In S930, the system combines available funds from all accounts and invests the funds in multiple investment products. In S940, the system user checks account status online.

Figure 10:
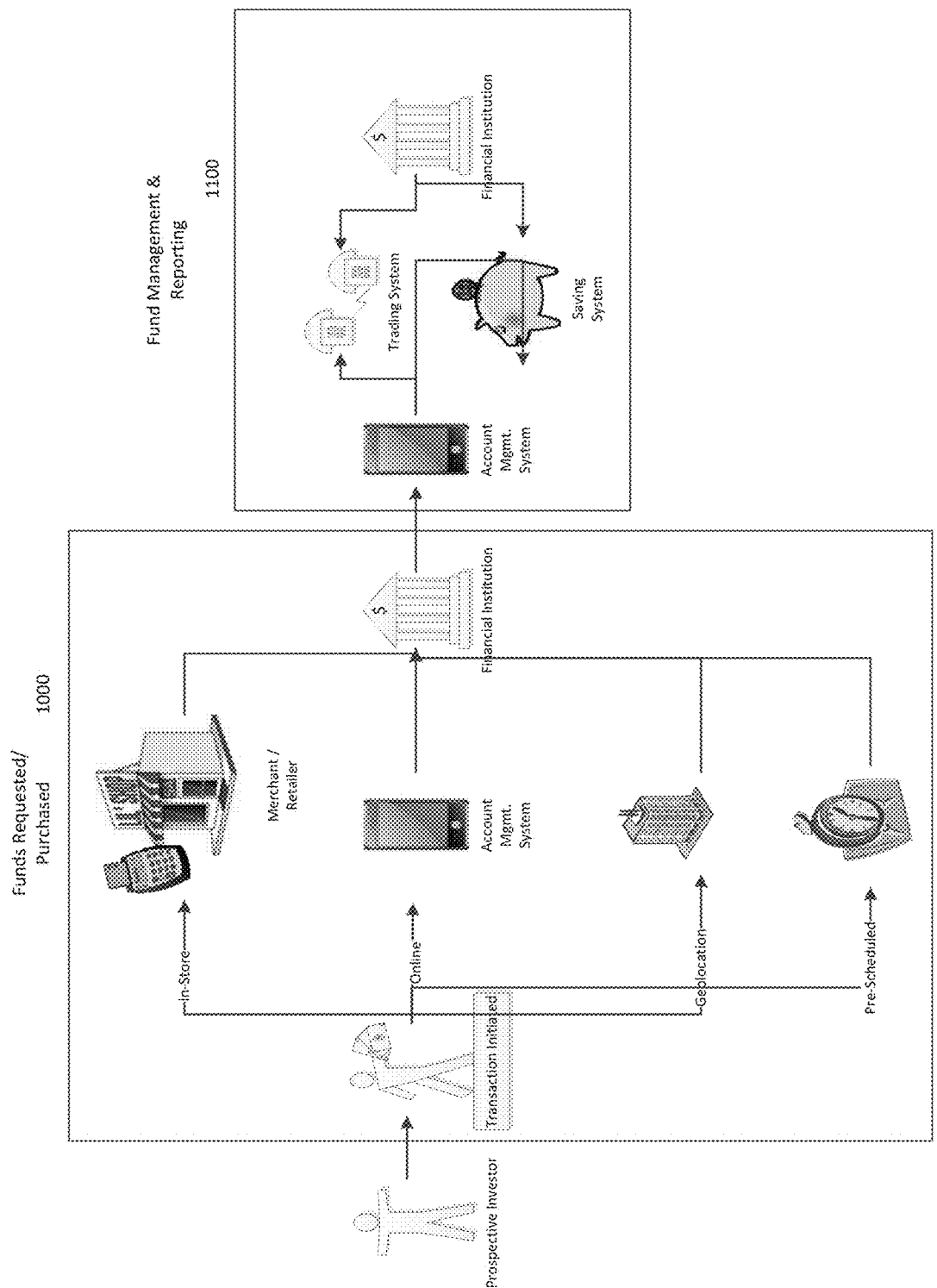
FIG. 10 is a flow diagram illustrating interaction between participants in an investment system in accordance with an embodiment of the invention.

FIG. 10 is a flow diagram illustrating interaction between participants in an investment system in accordance with an embodiment of the invention. The process of initiating a transaction is shown at 1000. As illustrated, the system participant can initiate a transaction in a store at the POS, online, through geo-location, or at a prescheduled time. For example, the system user may make an investment quarterly. In any of these cases, the transaction management system, which may be hosted by a financial institution, receives the transaction. As shown at 1100, the transaction management system either utilizes internal resources or external brokers or trading systems to manage the funds deposited as a result of the transaction. Enhancements to the entities and processes shown in FIG. 10 are within the scope of the invention. For example, system users may add funds by issuing voice commands, using a card serial number, or utilizing a QR code. The geolocation functionality can be utilized to automatically add funds when the user is in a certain location based on pre-set user parameters. Further, the transaction management may provide push notifications regarding stock performance and buy/sell/hold ratings. Additionally, the transaction management system may leverage a social media presence, thereby offering system users the opportunity to follow investment performance through social media. The transaction management system removes the financial advisor from the picture and simplifies the investing process by pushing the financial advisor to the back of the system. The investor only needs to deposit funds into an account. The funds are collected into a pool from all accounts, and the broker or investment software invests the funds in the stock market.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc., that perform particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At minimum, the memory includes at least one set of instructions that are either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. A computer may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processors and/or memories may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communication protocols may include TCP/IP, UDP, or OSI, for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

It should also be readily apparent to one of ordinary skill in the art that the presently disclosed invention may be implemented in a wide range of industries. The various embodiments and features of the presently disclosed invention may be used in any combination, as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalent.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A transaction management system for managing disposition of funds for system users based on account activity, the system comprising:

a computer memory storing account data for the system users and instructions and at least a downloadable mobile application, wherein the downloadable mobile application is downloadable over the Internet for installation on a system user mobile device;

an interface for receiving parameters entered by the system users through the downloadable mobile application on the system user mobile device or through a website for storage in the computer memory;

a computer processor accessing the computer memory and executing the instructions to perform operations including:
  receiving, through the interface over a network, an indication of account activity by a system user;
  determining a type of account activity;
  identifying a spending category for the account activity;
  determining prior spending of the system user for the identified spending category;
  determining a forecast of total spending in the identified spending category based on the determined prior spending and the account activity, the forecast including predicted spending for a predesignated time period;
  determining whether the account activity is indicative of system user underspending in the identified spending category by comparing the forecast to a predetermined budget corresponding to the identified spending category;
  generating a first push notification to the system user mobile device when the account activity is indicative of underspending, the first push notification offering an investment option to the system user and including an interactive interface prompting the system user to accept or decline an investment of an underspent amount;
  generating a second push notification to the system user mobile device when the account activity is not indicative of underspending, the second push notification including an accounting update; and
  generating a third push notification that includes budget data to the system user mobile device following at least one from among the first push notification and the second push notification, the budget data including an average consumer spending of a plurality of consumers in a geographic location and in a salary range;

predictive analytics to perform the forecast of total spending in the identified spending category during the predesignated time period based on the stored user account data;

geolocation processing tools that include at least one from among a global positioning system, a near field communication system, and a location beacon interacting with the predictive analytics to perform the forecast based on a current location and based on previous transactions at that location; and a website accessible to the system user, wherein at least one of the first push notification and the second push notification contains a unique URL of the website allowing the system user to access the account activity thereof.

2. The system of claim 1, wherein the types of account activity include at least cash withdrawals and purchases.

3. The system of claim 1, further comprising receiving over the network from the system user, selection of an investment option and directing investment based on the selection.

4. The system of claim 3, wherein when an account activity includes a cash withdrawal, the spending category is determined by generating a third push notification to the mobile device of the system user and receiving user input in response to the third push notification.

5. The system of claim 1, wherein the computer processor is further configured to track system user spending by category and to calculate underspending.

6. The system of claim 1, further comprising a mobile app communicator for receiving information from the system users entered through the downloadable mobile application on the system user mobile device.

7. The system of claim 1, wherein the computer processor is further configured to invest the forecast underspent amount before an end of an accounting period.

8. A transaction management method for managing disposition of funds for system users based on account activity, the method comprising:
  storing account data for the system users and instructions and at least a downloadable mobile application in a computer memory, wherein the downloadable mobile application is downloadable over the Internet for installation on a system user mobile device; and
  accessing the computer memory using a computer processor and executing the instructions to perform operations including:
    receiving, through an interface over a network, an indication of account activity by a system user;
    determining a type of account activity;
    identifying a spending category for the account activity;
    determining prior spending of the system user for the identified spending category;
    determining a forecast of total spending in the identified spending category based on:
      the determined prior spending and the account activity by using predictive analytics, and
      a current location and previous transactions at that location by using geolocation processing tools that include at least one from among a global positioning system, a near field communication system, and a location beacon,
    wherein the forecast includes a predicted spending for a predesignated time period;
    determining whether the account activity is indicative of system user underspending in the identified spending category by comparing the forecast to a predetermined budget corresponding to the identified spending category;
    generating a first push notification to the system user mobile device when the account activity is indicative of underspending, the first push notification offering an investment option to the system user and including an interactive interface prompting the system user to accept or decline an investment of an underspent amount;
    generating a second push notification to the system user mobile device when the account activity is not indicative of underspending, the second push notification including an accounting update; and
    generating a third push notification that includes budget data to the system user mobile device following at least one from among the first push notification and the second push notification, the budget data including an average consumer spending of a plurality of consumers in a geographic location and in a salary range,
  wherein at least one of the first push notification and the second push notification contains a unique URL of a website allowing the system user to access the account activity thereof.

9. The method of claim 8, wherein the types of account activity include at least cash withdrawals and purchases.

10. The method of claim 8, further comprising receiving over the network from the system user, selection of an investment option and directing investment based on the selection.

11. The method of claim 10, wherein when an account activity includes a cash withdrawal, the spending category is determined by generating a third push notification to the mobile device of the system user and receiving user input in response to the third push notification.

12. The method of claim 8, further comprising receiving parameters entered through the interface entered by the system users through the downloadable mobile application on the system user mobile device or through a website for storage in the computer memory and using the parameters to track user spending by category.

13. The method of claim 8, further comprising receiving information from the system users entered through the downloadable mobile application on the system user mobile device.

14. The method of claim 8, wherein the computer processor is further configured to invest the forecast underspent amount before an end of an accounting period.

* * * * *